(12) United States Patent
Yang et al.

(10) Patent No.: US 8,682,455 B2
(45) Date of Patent: Mar. 25, 2014

(54) REPETITIVE CONTROLLER, CONTROL METHOD THEREOF AND FEEDBACK CONTROL SYSTEM

(75) Inventors: Guoshun Yang, Shenzhen (CN); Qingfeng Zhuo, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 13/451,121

(22) Filed: Apr. 19, 2012

(65) Prior Publication Data

US 2012/0271436 A1    Oct. 25, 2012

(30) Foreign Application Priority Data

Apr. 22, 2011 (CN) .......................... 2011 1 0102259

(51) Int. Cl.
*G05B 19/04* (2006.01)
(52) U.S. Cl.
USPC .................................. 700/54; 700/11; 700/55
(58) Field of Classification Search
USPC ..................................... 700/11, 28, 29, 54, 55
See application file for complete search history.

(56) References Cited

U.S. PATENT DOCUMENTS

| | | | |
|---|---|---|---|
| 7,164,953 B2 * | 1/2007 | Zhang et al. | 700/41 |
| 7,247,955 B2 * | 7/2007 | Tracy et al. | 307/151 |
| 7,684,879 B2 * | 3/2010 | Yutkowitz | 700/29 |
| 8,040,098 B2 * | 10/2011 | Zhang et al. | 318/609 |
| 2004/0239280 A1 * | 12/2004 | Zhang et al. | 318/609 |
| 2006/0271232 A1 * | 11/2006 | Toyama et al. | 700/166 |
| 2007/0268068 A1 * | 11/2007 | Yutkowitz | 329/325 |
| 2009/0251092 A1 * | 10/2009 | Zhang et al. | 318/609 |

OTHER PUBLICATIONS

First Chinese Office Action regarding Application No. 201110102259.3, dated Oct. 31, 2012. Translation provided by Unitalen Attorneys At Law.
Second Chinese Office Action regarding Application No. 201110102259.3, dated Jul. 3, 2013. Translation provided by Unitalen Attorneys At Law.
Patent Law of the People's Republic of China (including Article 25). Last amended Dec. 27, 2008. http://english.sipo.gov.cn/laws/lawsregulations/201101/t20110119_566244.html.

* cited by examiner

*Primary Examiner* — Charles Kasenge
(74) *Attorney, Agent, or Firm* — Harness, Dickey & Pierce, P.L.C.

(57) ABSTRACT

A repetitive controller, a control method thereof and a feedback control system are disclosed. The repetitive controller includes an internal model section, a periodic delay module and a compensation module. An input quantity is input into the repetitive controller via an input terminal of the internal model section; the internal model section, the periodic delay module and the compensation module are connected in series. The repetitive controller further includes a particular frequency selection and passing module, connected in series with the internal model section, the periodic delay module and the compensation module or configured on a forward path of the internal model section. In the repetitive controller of the disclosure, a particular frequency selection and passing module is incorporated such that only the harmonic at the selected frequency are filtered out, thereby realizing the function of removing the harmonic at the particular frequency.

8 Claims, 9 Drawing Sheets

US 8,682,455 B2

REPETITIVE CONTROLLER, CONTROL METHOD THEREOF AND FEEDBACK CONTROL SYSTEM

CROSS REFERENCE TO RELATED APPLICATION

The application claims priority to Chinese patent application No. 201110102259.3 submitted with the Chinese patent office on Apr. 22, 2011, entitled "Repetitive Controller, Control Method Thereof and Feedback Control System", the entire contents of which are incorporated herein by reference as if fully set forth.

FIELD

The present disclosure relates to repetitive controllers, and particular to a repetitive controller and a control method thereof of canceling harmonics for a particular frequency, as well as a feedback control system including such a repetitive controller.

BACKGROUND

For years, the problem of tracking and disturbance suppressing of a repetitive signal has been attracting much attention in the art. Repetitive control based on internal model principle is an effective control method for this purpose. FIG. 1 shows the structure of a control system having a conventional repetitive controller. As shown in FIG. 1, the given input quantity of the control system is denoted by r, and the output quantity of the control system is denoted by y. The control error quantity r−y of the control system is input into a repetitive controller 100 as its input quantity denoted by e. The repetitive controller 100 includes an internal model section 1, a periodic delay module 2, and a compensation module 3 which are connected in series. The input quantity e is input via the input terminal of the internal model section 1. The internal model section 1 makes the fundamental wave distortion occurred in the last period to be reproduced in the next period. The signal output from the internal model section 1 is subjected to the following periodic delay and compensation to obtain a repetitive-controlled output control quantity $u_r$. Then the control quantity $u_r$ is applied to the controlled object P(z). The disturbance d is superposed on the signal output from P(z) to obtain the output quantity y of the control system.

The internal model section 1 is a critical unit in the repetitive controller 100. It is a closed loop system consisting of a forward path, a feedback path and an adder. The feedback path includes an internal model periodic delay module $z^{-N}$ and an internal model filter module Q(z) which are connected in series. The transfer function of an ideal internal model (Q(z)=1) is as follows:

$$\frac{z^{-N}}{1-z^{-N}},$$

The extreme point of the above transfer function is $k\omega_0$, where k is an integer and $\omega_0$ is the fundamental wave angular frequency. As can be seen, the gain of the ideal internal model on the fundamental wave and the integer harmonics is infinite. Since the input quantity e=r−y, the harmonic components in the input quantity e are in reverse direction to that of the harmonic components (i.e. the disturbance d) in the feedback quantity y. Thus, after the disturbance d is superposed, those harmonic components may counteract with each other and the finally obtained feedback quantity y does not contain any integer harmonics. As can be seen, in the above control system the integer harmonic components may be cancelled. That is, all the integer harmonic components can be removed.

However, in actual electric and electronic systems, only harmonics at some particular frequencies need to be tracked or cancelled. For example, the harmonic components resulted from dead time effect and non-linear load mainly include the $3^{rd}$, $5^{th}$, and $7^{th}$ harmonic components, but include very few harmonics of medium and high frequencies. In such cases, if the above described conventional repetitive controller is used, the large gain of the conventional repetitive controller at medium and high frequencies may cause the stability margin of the whole control system to be reduced, such that the control performance requirements of the system can not be met. In view of this, it is desired to propose a novel repetitive controller which only cancels the harmonics at particular frequencies so that the control performance of harmonic canceling may be performed with respect to the particular frequencies and the stability margin of the whole control system may be improved.

SUMMARY

Some embodiments of the disclosure provide a repetitive controller, a control method thereof, as well as a feedback control system including the same, by which the harmonics at particular frequencies can be canceled, so as to make up the deficiency in the related art.

According to an embodiment of the disclosure, a repetitive controller includes an internal model section, a periodic delay module and a compensation module, an input quantity is input into the repetitive controller via an input terminal of the internal model section; the internal model section, the periodic delay module and the compensation module are connected in series. The repetitive controller further includes a particular frequency selection and passing module connected in series with the internal model section, the periodic delay module and the compensation module or configured on a forward path of the internal model section.

Optionally, the particular frequency selection and passing module is a frequency selection module or a frequency selection and phase shift module.

Optionally, the particular frequency selection and passing module may be a frequency selection module, the compensation module may be a first compensation module including a repetitive control gain module, a phase lead compensation module and a compensation filtering module connected in series.

The internal model section may be a first internal model and include an adder, an internal model periodic delay module and an internal model filtering module. The first input terminal of the adder is the input terminal of the internal model section, the internal model periodic delay module and the internal model filtering module are connected in series to form a feedback path, the output terminal of the feedback path is connected to the second input terminal of the adder, and the input terminal of the feedback path is connected to the output terminal of the adder.

Optionally, the particular frequency selection and passing module may be a frequency selection and phase shift module, the compensation module may be a second compensation module including a repetitive control gain module and a compensation filtering module connected in series.

The frequency selection and phase shift module is connected in series with the internal model section, the periodic delay module and the compensation module. The internal model section may be a first internal model and include an adder, an internal model periodic delay module and an internal model filtering module. The first input terminal of the adder is the input terminal of the internal model section, the internal model periodic delay module and the internal model filtering module are connected in series to form a feedback path, the output terminal of the feedback path is connected to the second input terminal of the adder, and the input terminal of the feedback path is connected to the output terminal of the adder.

The frequency selection and phase shift module may be provided on the forward path of the internal model section. The internal model section may be a second internal model and include an adder, an internal model delay module, an internal model periodic delay module and an internal model filtering module. The first input terminal of the adder is the input terminal of the internal model section, the internal model delay module, the internal model periodic delay module and the internal model filtering module are connected in series to form a feedback path, the output terminal of the feedback path is connected to the second input terminal of the adder, and the input terminal of the feedback path is connected to the output terminal of the adder.

According to another embodiment of the disclosure, a control method based on the above repetitive controller includes: performing, by an internal model section, signal reproduction on an input quantity to be repetitively controlled; delaying, by a periodic delay module, the input quantity and outputting the delayed quantity; and compensating the periodically delayed quantity to obtain a repetitively controlled quantity, wherein the input quantity is subjected to a filter processing at a particular frequency before being input into the internal model section or a forward path of the internal model section or the periodic delay module or the compensation model or before being output from the compensation module.

According to another embodiment of the disclosure, a feedback control system may include a subtractor, a repetitive controller, a control object and an adder. The repetitive controller may be the above described repetitive controller. A positive input terminal of the subtractor is configured to receive a given input quantity and a negative input terminal of the subtractor is connected to an output terminal of the adder. An output terminal of the subtractor is connected to an input terminal of the repetitive controller. An output terminal of the repetitive controller is connected to the control object. An output terminal of the control object is connected to a first input terminal of the adder. A second input terminal of the adder is connected to a system disturbance quantity.

Compared with the related art, the embodiments of the disclosure may bring about some advantageous effects. In the repetitive controller according to some embodiments of the disclosure, a particular frequency selection and passing module is incorporated, by which only the harmonics at some selected particular frequencies are removed from the error signal. In other words, in the repetitive controller only the gain for the selected particular frequencies are configured to be relatively large, so that only the harmonics at the selected particular frequencies are cancelled when being superposed with the disturbance signal d. In this way, the repetitive controller removes only the harmonics at particular frequencies.

DETAILED DESCRIPTION

The embodiments of the disclosure are described below in detail with reference to the drawings.

The First Embodiment

Figure 1:
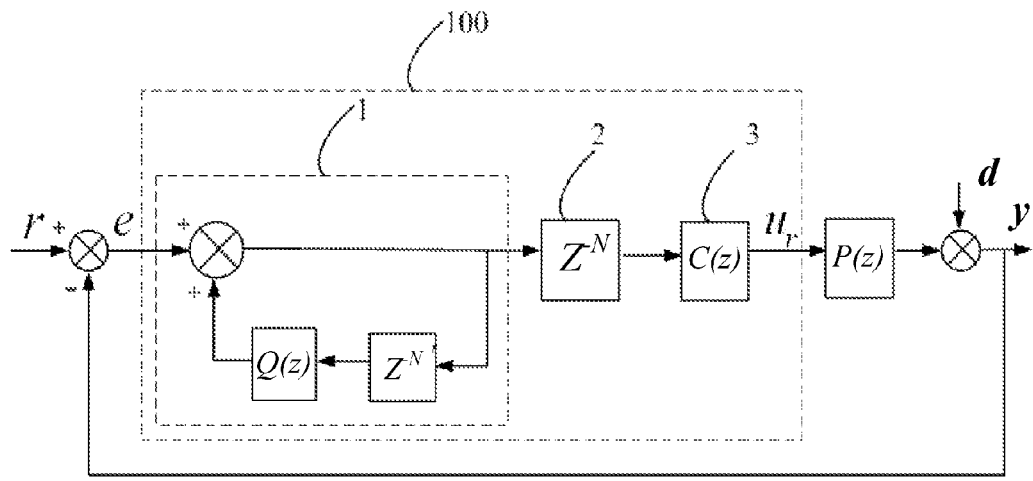
FIG. 1 is a schematic diagram showing the structure of a control system including a repetitive controller according to the related art.
Figure 2:
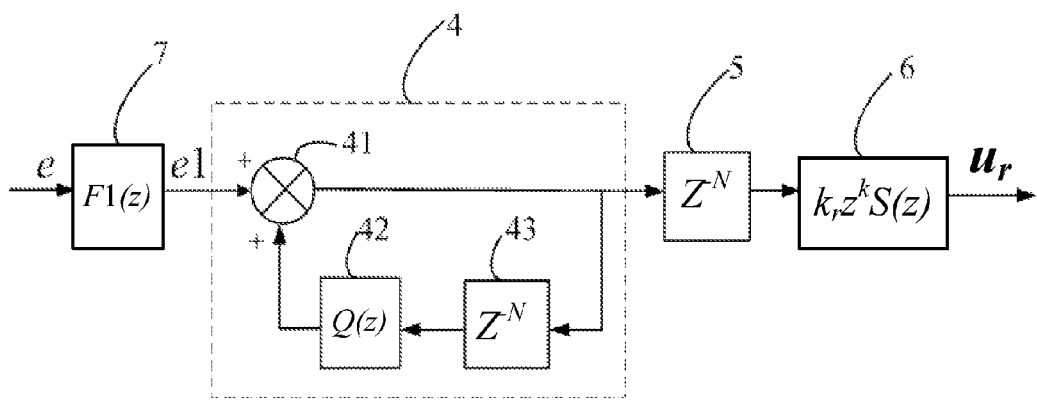
FIG. 2 is a schematic diagram showing the structure of a repetitive controller according to a first embodiment of the disclosure.

FIG. 2 is a schematic diagram showing the structure of a repetitive controller according to the first embodiment of the disclosure. As shown in FIG. 2, the repetitive controller includes an internal model section 4, a periodic delay module 5, a first compensation module 6 and a particular frequency selection and passing module 7. The particular frequency selection and passing module 7 is the frequency selection module $F1(z)$ configured to perform frequency selection to the harmonics at the particular frequencies in the error signal e. The particular frequency selection and passing module 7 is provided at the input terminal of the internal model section 4, and is connected in series to the internal model section 4, the periodic delay module 5, and the first compensation module 6.

The internal model section 4 corresponds to a first internal model and includes an adder 41, an internal model periodic delay module 43 and an internal model filtering module 42. The internal model filtering module 42 is denoted as $Q(z)$ which may be a filter or may be a constant less than 1. The internal model periodic delay module 43 is denoted as $z^{-N}$. The first input terminal of the adder 41 is used as the input terminal of the internal model section 4, for receiving the error signal e1 processed by the frequency selection module $F1(z)$. The internal model periodic delay module 43 and the internal model filtering module 42 are connected in series to form a feedback path. The output terminal of the feedback path, i.e. a terminal of the internal model filtering module 42, is connected to the second input terminal of the adder 41. The input terminal of the feedback path, i.e. a terminal of the internal model periodic delay module 43, is connected to the output terminal of the adder 41. The feedback path and the forward path constitute a closed ring, to form the internal model section 4.

The periodic delay module 5 is a $z^{-N}$ module.

The first compensation module 6 includes a repetitive control gain module $k_r$, a phase lead compensation module $z^k$ and a compensation filtering module $S(z)$.

The frequency selection module $F1(z)$ is configured to select and pass signals at a particular frequency. The frequency selection module may be a digital cosine transform (DCT) filter, or may be a filter for selecting and passing signals at a particular frequency which may be realized by using fast Fourier transform (FFT) or digital Fourier transform (DFT) techniques. In this embodiment, the frequency selection module $F1(z)$ is configured as a DCT filter which may be expressed by the following expression (1):

$$F1(z) = \frac{2}{N} \sum_{i=0}^{N-1} \left\{ \sum_{h \in N_h} \cos\left(\frac{2\pi}{N} hi\right) \right\} z^{-i} \quad (1)$$

wherein N denotes the number of sample points of the fundamental wave, $N_h$ denotes the set of harmonics to be removed, and h denotes the degree of a particular harmonic. For example, in the case that the 5th harmonic is to be removed, the set of harmonics $N_h=5$ and h=5. In the case that the fundamental wave, $5^{th}$ harmonic and $7^{th}$ harmonic are to be removed, the set of harmonics $N_h=\{1, 5, 7\}$ and h=1, or 5, or 7.

The transfer function of the repetitive controller shown in FIG. 2 may be expressed as follows:

$$\frac{2}{N} \sum_{i=n}^{N-1} \left\{ \sum_{h \in N_h} \cos\left(\frac{2\pi}{N} hi\right) \right\} z^{-i} \times \frac{z^{-N}}{1 - Q(z) z^{-N}} \times k_r z^k S(z) \quad (2)$$

Figure 3:
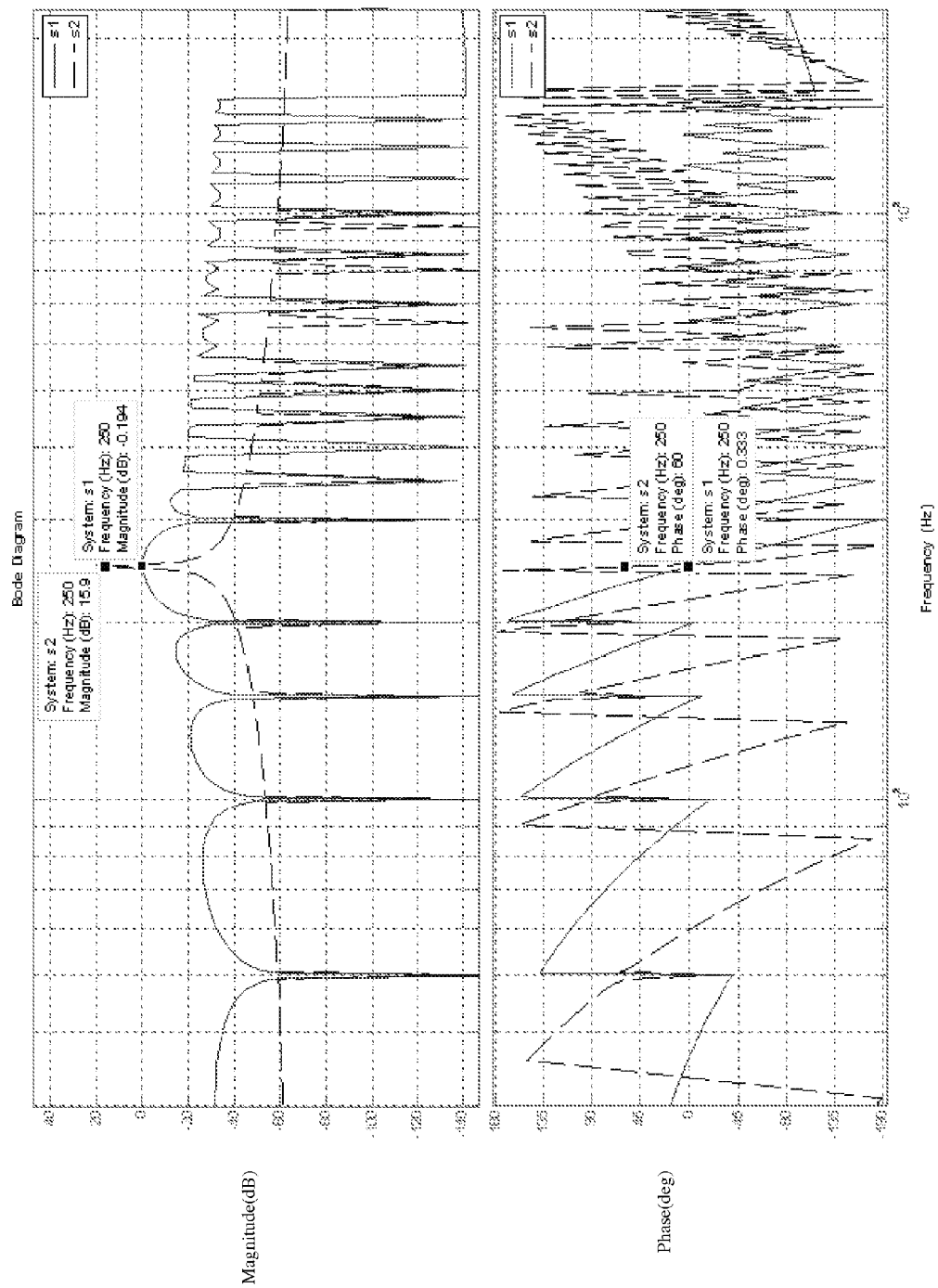
FIG. 3 is a schematic diagram illustrating an emulation result of the repetitive controller shown in FIG. 2.

As an emulation example of the repetitive controller shown in FIG. 2, it is supposed that the fundamental wave frequency $f_0=50$ Hz and the sampling frequency $f_s=4.5$ kHz, thus the number N of the sample points of the fundamental wave is: $N=f_s/f_0=90$. It is also supposed that the set of harmonics $N_h=5$ and h=5; the internal model filtering module $Q(z)$ in the internal model section 4 is set as $Q(z)=0.99$; the compensation filtering module $S(z)$ in the first compensation module 6 is set as 1; the number k of beats of the phase lead compensation module $z^k$ in the first compensation module 6 is set as k=3, i.e. the phase shift is 60°; and the repetitive control gain module $k_r$ in the first compensation module 6 is set as $k_r=0.0625$. FIG. 3 shows the amplitude-frequency characteristics and the phase-frequency characteristics of the emulated frequency selection module $F1(z)$ and the repetitive controller. As shown in FIG. 3, the upper part diagram illustrates the amplitude-frequency characteristics, and the lower part diagram illustrates the phase-frequency characteristics; the solid line s1 corresponds to the characteristics of the frequency selection module $F1(z)$ and the dot line s2 corresponds to the characteristics of the repetitive controller. With respect to the solid line s1, as shown in the amplitude-frequency characteristics, only the gain at the frequency of 250 Hz (i.e. the $5^{th}$ harmonic) is −0.194 dB, which is nearly 0 dB, while the gains at other frequencies are much lower than −3 dB, that is, it is attenuated or cut off for the other frequencies; and as shown in the phase-frequency characteristics, the phase at the frequency of 250 Hz (i.e. the $5^{th}$ harmonic) is 0.333, which is nearly 0°. As can be seen, the frequency selection module $F1(z)$ may pass the $5^{th}$ harmonic with zero phase shift and without attenuation, while it is attenuated or cut off for the signal at other frequencies. With respect to the dot line s2, as shown in the amplitude-frequency characteristics, only the gain at the frequency of 250 Hz (i.e. the $5^{th}$ harmonic) is 15.9 dB, while the gains at other frequencies are much lower than −3 dB; and as shown in the phase-frequency characteristics, the phase at the frequency of 250 Hz is 60°. As can be seen, the control of the repetitive controller on the $5^{th}$ harmonic is much higher than that on the signal at other frequencies. In addition, the repetitive controller may realize a phase lead compensation of 60° to the $5^{th}$ harmonic, while it does not perform such a control on the signal at other frequencies. Therefore, the repetitive controller can remove the harmonic at the particular frequency, i.e. the 5th harmonic.

The Second Embodiment

The difference between the second embodiment and the first embodiment lies in that, in the second embodiment the frequency selection module $F1(z)$ is provided at the output terminal of the first compensation module 6, while in the first embodiment the frequency selection module $F1(z)$ is provided at the input terminal of the internal model section 4.

Figure 4:
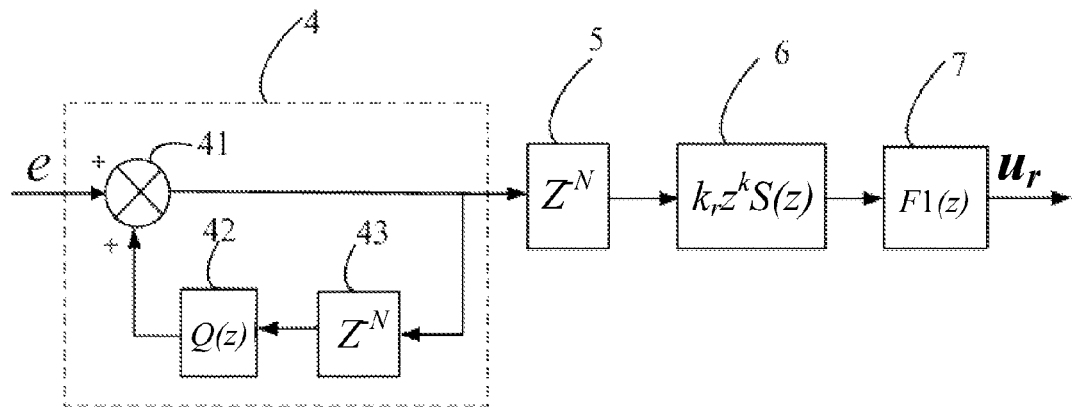
FIG. 4 is a schematic diagram showing the structure of a repetitive controller according to a second embodiment of the disclosure.

FIG. 4 shows the repetitive controller according to the second embodiment. As shown, the modules in FIG. 4 are the same with those in FIG. 2, respectively, except the locations of the particular frequency selection and passing module 7. The transfer function of the repetitive controller of FIG. 4 is the same with that shown in FIG. 2, i.e. the expression (2). Thus, the repetitive controller of FIG. 4 can remove the harmonic at a particular frequency.

Further, as can be seen from the above analysis, in the case that the particular frequency selection and passing module 7 is provided at the input terminal of the periodic delay module 5 or the input terminal of the first compensation module 6, the internal model section 4, the periodic delay module 5 and the first compensation module 6 are also connected in series and thus the transfer function of the repetitive controller in such case is the same with the expression (2). Therefore, such a repetitive controller can also remove the harmonic at a particular frequency.

The Third Embodiment

The difference between the third embodiment and the first embodiment lies in that, in the third embodiment the frequency selection module $F1(z)$ is provided on the forward path of the internal model section 4, while in the first embodiment the frequency selection module $F1(z)$ is provided at the input terminal of the internal model section 4.

Figure 5:
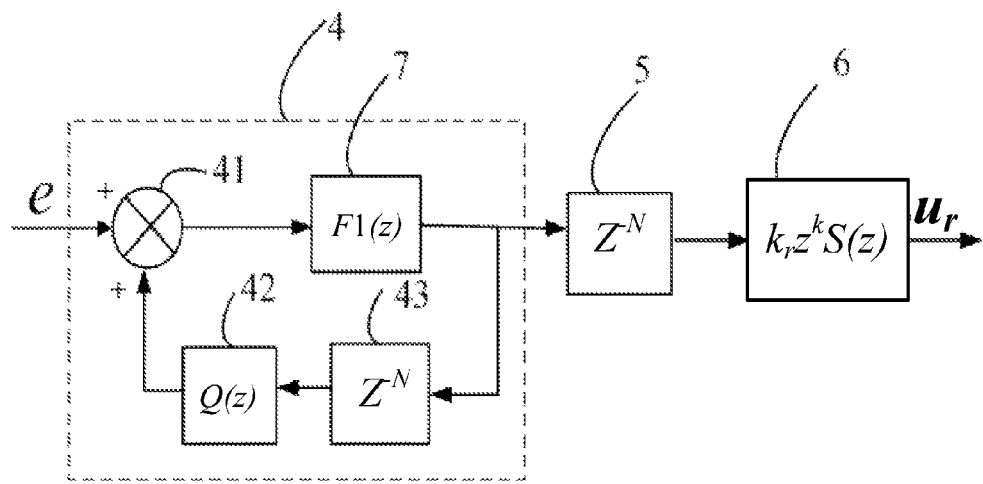
FIG. 5 is a schematic diagram showing the structure of a repetitive controller according to a third embodiment of the disclosure.

FIG. 5 shows the repetitive controller according to the third embodiment. As shown, the modules in FIG. 5 are the same with those in FIG. 2, respectively, except the locations of the particular frequency selection and passing module 7. As an example, if the frequency selection module $F1(z)$ is a DCT filter, the transfer function of the repetitive controller of FIG. 5 is as follows:

$$\frac{2}{N} \sum_{i=0}^{N-1} \left\{ \sum_{h \in N_h} \cos\left(\frac{2\pi}{N} hi\right) \right\} z^{-i} \times \quad (3)$$

-continued $$\frac{z^{-N}}{1 - \frac{2}{N}\sum_{i=0}^{N-1}\left\{\sum_{h\in N_h}\cos\left(\frac{2\pi}{N}hi\right)\right\}z^{-i} \times Q(z)z^{-N}} \times k_r z^k S(z)$$

Figure 6:
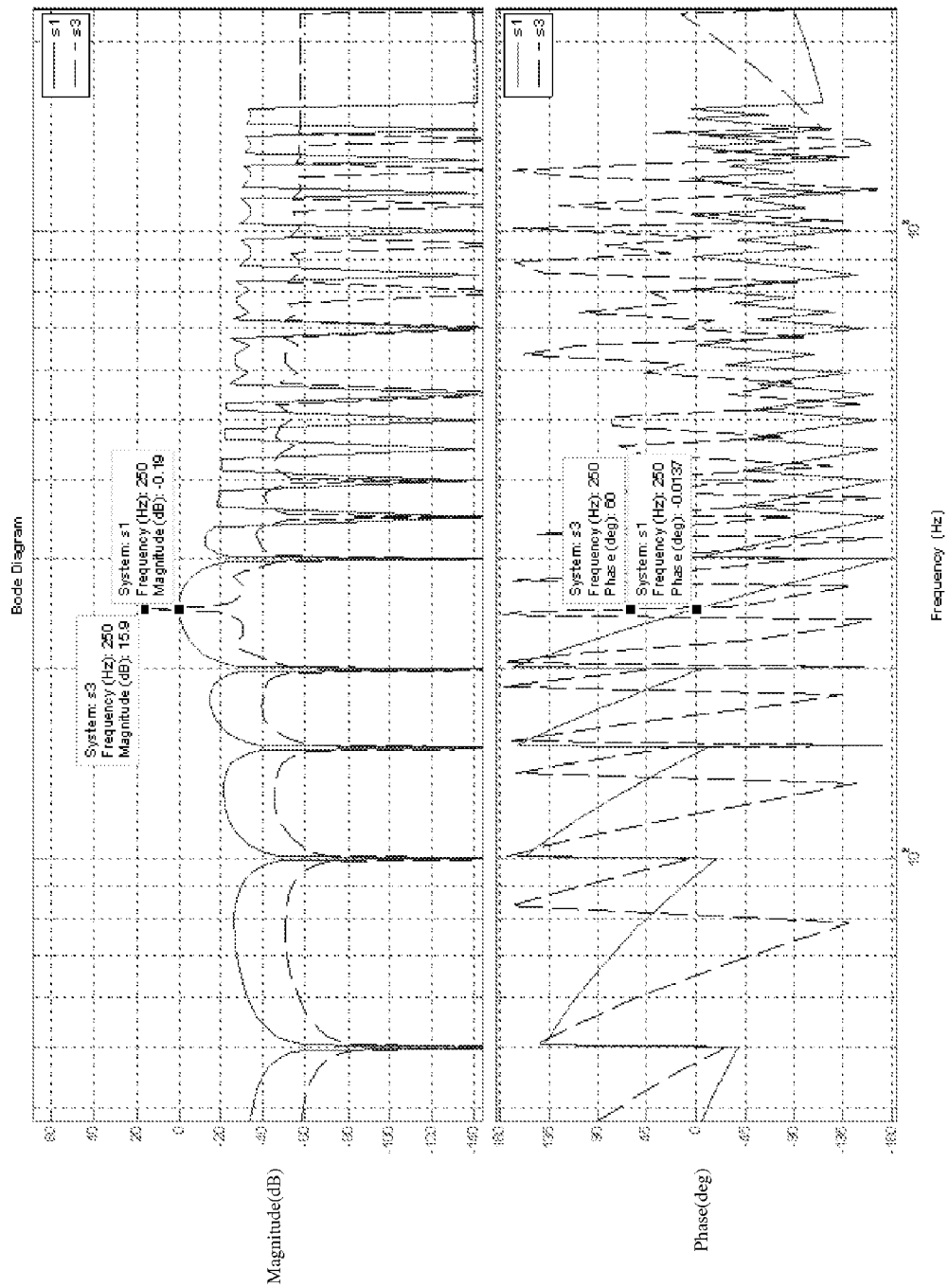
FIG. 6 is a schematic diagram illustrating an emulation result of the repetitive controller shown in FIG. 5.

As an emulation example of the repetitive controller shown in FIG. 5, it is supposed that the parameters are the same with those described above in the emulation example of the repetitive controller shown in FIG. 2. FIG. 6 shows the amplitude-frequency characteristics and the phase-frequency characteristics of the emulated frequency selection module F1($z$) and the repetitive controller. As shown in FIG. 6, the upper part diagram illustrates the amplitude-frequency characteristics, and the lower part diagram illustrates the phase-frequency characteristics; the solid line s1 corresponds to the characteristics of the frequency selection module F1($z$) and the dot line s3 corresponds to the characteristics of the repetitive controller. With respect to the solid line s1, as shown in the amplitude-frequency characteristics, only the gain at the frequency of 250 Hz (i.e. the 5$^{th}$ harmonic) is −0.19 dB, which is nearly 0 dB, while the gains at other frequencies are much lower than −3 dB, that is, it is attenuated or cut off for the other frequencies; and as shown in the phase-frequency characteristics, the phase at the frequency of 250 Hz is −0.0137, which is nearly 0°. As can be seen, the frequency selection module F1($z$) may pass the 5$^{th}$ harmonic with zero phase shift and without attenuation, while it is attenuated or cut off for the signal at other frequencies. With respect to the dot line s3, as shown in the amplitude-frequency characteristics, only the gain at the frequency of 250 Hz (i.e. the 5$^{th}$ harmonic) is 15.9 dB, while the gains at other frequencies are much lower than −3 dB; and as shown in the phase-frequency characteristics, the phase at the frequency of 250 Hz is 60°. As can be seen, the control of the repetitive controller on the 5$^{th}$ harmonic is much higher than that on the signal at other frequencies. In addition, the repetitive controller may realize a phase lead compensation of 60° to the 5$^{th}$ harmonic, while it does not perform such a control on the signal at other frequencies. Therefore, the repetitive controller can remove the harmonic at the particular frequency, i.e. the 5th harmonic.

The Fourth Embodiment

The difference between the fourth embodiment and the first embodiment lies in that, in the fourth embodiment the particular frequency selection and passing module is a frequency selection and phase shift module F2($z$) and the corresponding compensation module is a second compensation module, while in the first embodiment the particular frequency selection and passing module is a frequency selection module F1($z$) and the corresponding compensation module is the first compensation module.

Figure 7:
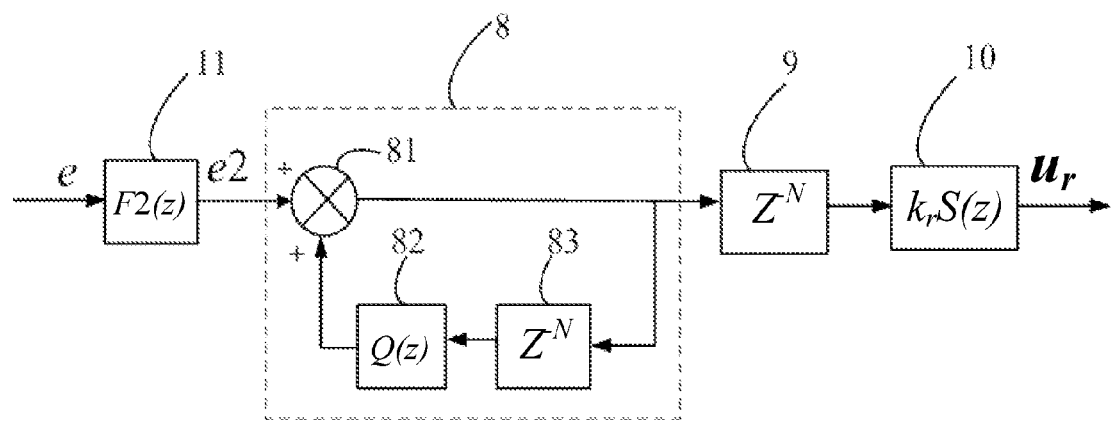
FIG. 7 is a schematic diagram showing the structure of a repetitive controller according to a fourth embodiment of the disclosure.

FIG. 7 shows the structure of a repetitive controller according to the fourth embodiment. As shown in FIG. 7, the repetitive controller includes an internal model section 8, a periodic delay module 9, a second compensation module 10 and a particular frequency selection and passing module 11. The particular frequency selection and passing module 11 is the frequency selection and phase shift module F2($z$) configured to perform frequency selection and phase lead compensation to the harmonics at the particular frequencies in the error signal e. The particular frequency selection and passing module 11 is provided at the input terminal of the internal model section 8, and is connected in series to the internal model section 8, the periodic delay module 9, and the first compensation module 10.

The internal model section 8 corresponds to the first internal model, and includes an adder 81, an internal model periodic delay module 83 and an internal model filtering module 82. The internal model filtering module 82 is denoted as Q(z) which may be a filter or may be a constant less than 1. The internal model periodic delay module 83 is denoted as $z^{-N}$. The first input terminal of the adder 81 is used as the input terminal of the internal model section 8, for receiving the error signal e1 processed by the frequency selection and phase shift module F2($z$). The internal model periodic delay module 83 and the internal model filtering module 82 are connected in series to form a feedback path. The output terminal of the feedback path, i.e. a terminal of the internal model filtering module 82, is connected to the second input terminal of the adder 81. The input terminal of the feedback path, i.e. a terminal of the internal model periodic delay module 83, is connected to the output terminal of the adder 81.

The feedback path and the forward path constitute a closed ring, to form the internal model section 8.

The periodic delay module 9 is a $z^{-N}$ module.

The first compensation module 10 includes a repetitive control gain module $k_r$, and a compensation filtering module S(z).

The frequency selection and phase shift module F2($z$) is configured to select and pass signal at a particular frequency and perform a phase shift of the signal at the particular frequency. The frequency selection and phase shift module may be a digital cosine transform (DCT) filter, or may be a filter for selecting and passing a signal at a particular frequency and performing a phase shift to the signal at the particular frequency which may be realized by using fast Fourier transform (FFT) or digital Fourier transform (DFT) techniques. In this embodiment, the frequency selection and phase shift module F2($z$) is configured as a DCT filter which may be expressed by the following expression (4):

$$F2(z) = \frac{2}{N}\sum_{i=0}^{N-1}\left\{\sum_{h\in N_h}\cos\left[\frac{2\pi}{N}h(i+k_h)\right]\right\}z^{-i} \quad (4)$$

Wherein N denotes the number of sample points of the fundamental wave, $N_h$ denotes the set of harmonics to be removed, h denotes the degree of a particular harmonic, and $k_h$ denotes the number of beats of phase shift corresponding to the harmonic at a particular harmonic to be removed. For example, in the case that the 5$^{th}$ harmonic is to be removed and the number of beats of phase lead compensation for the 5$^{th}$ harmonic is 6, the set of harmonics $N_h$=5 and h=5, $k_h$=6. In the case that the fundamental wave, 5$^{th}$ harmonic and 7$^{th}$ harmonic are to be removed and the numbers of beats of phase lead compensation for the fundamental wave, 5$^{th}$ harmonic and 7$^{th}$ harmonic are 2, 8, and 6, respectively, the set of harmonics $N_h$=1,1,5,71 and h=1, or 5, or 7. When h=1, $k_h$=2; when h=5, $k_h$=8; and when h=7, $k_h$=6. These parameters may be applied to the above expression 4. The frequency selection and phase shift module F2($z$) has both the function of frequency selection and the function of phase shift. That is, it can select and pass the signal at a particular frequency and perform a phase shift with a given number of beats on the signal at the particular frequency.

The transfer function of the repetitive controller shown in FIG. 7 may be expressed as follows:

$$\frac{2}{N} \sum_{i=0}^{N-1} \left\{ \sum_{h \in N_h} \cos\left[\frac{2\pi}{N} h(i+k_h)\right] \right\} z^{-i} \times \frac{z^{-N}}{1-Q(z)z^{-N}} \times k_r S(z) \quad (5)$$

Figure 8:
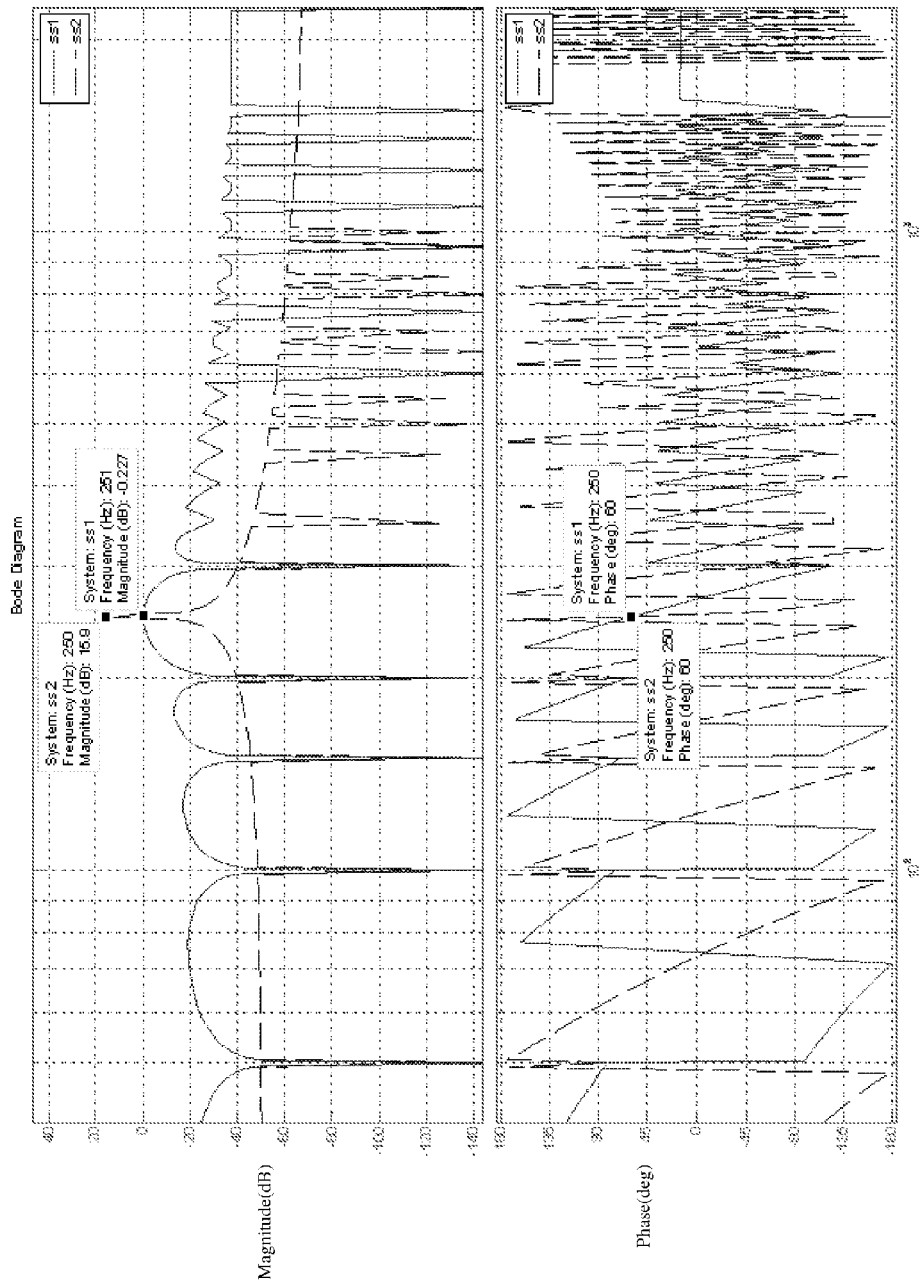
FIG. 8 is a schematic diagram illustrating an emulation result of the repetitive controller shown in FIG. 7.

As an emulation example of the repetitive controller shown in FIG. 7, it is supposed that the fundamental wave frequency $f_0$=50 Hz and the sampling frequency $f_s$=4.5 kHz, thus the number N of the sample points of the fundamental wave is: N=$f_s/f_0$=90. It is also supposed that the set of harmonics $N_h$=5 and h=5; the number of beats of phase lead compensation performed by the frequency selection and phase shift module F2(z) is $k_h$=3 (i.e. the frequency selection and phase shift module F2(z) performs a phase shift of 60° to the 5$^{th}$ harmonic); the internal model filtering module 82 in the internal model section 8 is set as Q(z)=0.99; the compensation filtering module S(z) in the second compensation module 10 is set as 1; and the repetitive control gain module $k_r$ in the second compensation module 10 is set as $k_r$=0.0625. FIG. 8 shows the amplitude-frequency characteristics and the phase-frequency characteristics of the emulated frequency selection and phase shift module F2(z) and the repetitive controller. As shown in FIG. 8, the upper part diagram illustrates the amplitude-frequency characteristics, and the lower part diagram illustrates the phase-frequency characteristics; the solid line ss1 corresponds to the characteristics of the frequency selection and phase shift module F2(z) and the dot line ss2 corresponds to the characteristics of the repetitive controller. With respect to the solid line ss1, as shown in the amplitude-frequency characteristics, only the gain at the frequency of 250 Hz (i.e. the 5$^{th}$ harmonic) is −0.227 dB, which is nearly 0 dB, while the gains at other frequencies are much lower than −3 dB, that is, it is attenuated or cut off for the other frequencies; and as shown in the phase-frequency characteristics, the phase at the frequency of 250 Hz is 60°. As can be seen, the frequency selection and phase shift module F2(z) may pass the 5$^{th}$ harmonic with a phase shift of 60° and without attenuation, while it is attenuated or cut off for the signal at other frequencies. With respect to the dot line ss2, as shown in the amplitude-frequency characteristics, only the gain at the frequency of 250 Hz is 15.9 dB, while the gains at other frequencies are much lower than −3 dB; and as shown in the phase-frequency characteristics, the phase at the frequency of 250 Hz is 60°. As can be seen, the control of the repetitive controller on the 5$^{th}$ harmonic is much higher than that on the signal at other frequencies. In addition, the repetitive controller may realize a phase lead compensation of 60° to the 5$^{th}$ harmonic, while it does not perform such a control on the signal at other frequencies. Therefore, the repetitive controller can remove the harmonic at the particular frequency, i.e. the 5th harmonic.

The Fifth Embodiment

The difference between the fifth embodiment and the fourth embodiment lies in that, in the fifth embodiment the frequency selection and phase shift module F2(z) is provided at the output terminal of the second compensation module 10, while in the fourth embodiment the frequency selection and phase shift module F2(z) is provided at the input terminal of the internal model section 8.

Figure 9:
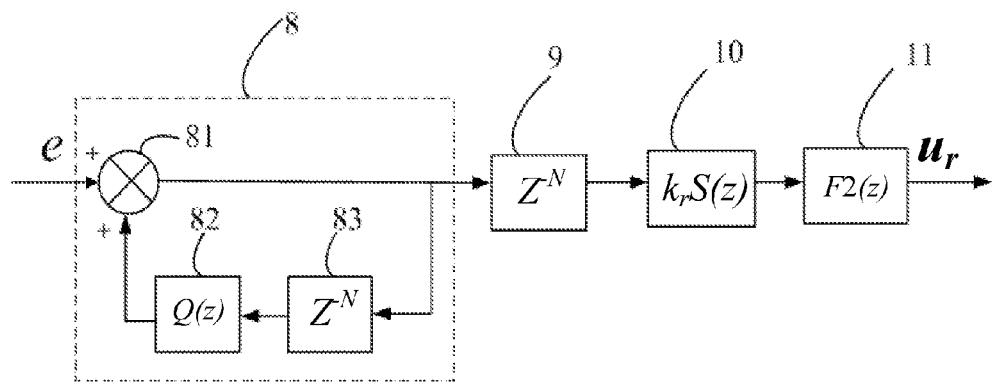
FIG. 9 is a schematic diagram showing the structure of a repetitive controller according to a fifth embodiment of the disclosure.

FIG. 9 shows the repetitive controller according to the fifth embodiment. As shown, the modules in FIG. 9 are the same with those in FIG. 7, respectively, except the locations of the particular frequency selection and passing module 11. The transfer function of the repetitive controller of FIG. 9 is the same with that shown in FIG. 7, i.e. the expression (5). Thus, the repetitive controller of FIG. 9 can remove the harmonic at a particular frequency.

Further, as can be seen from the above analysis, in the case that the particular frequency selection and passing module 11 is provided at the input terminal of the periodic delay module 9 or the input terminal of the second compensation module 10, the internal model section 8, the periodic delay module 9 and the second compensation module 10 are also connected in series and thus the transfer function of the repetitive controller in such case is the same with the expression (5). Therefore, such a repetitive controller can also remove the harmonic at a particular frequency.

The Sixth Embodiment

The difference between the sixth embodiment and the fourth embodiment lies in that, in the sixth embodiment the frequency selection and phase shift module F2(z) is provided on the forward path of the internal model section 12 which corresponds to the second internal model, while in the fourth embodiment the frequency selection and phase shift module F2(z) is provided at the input terminal of the internal model section 8 which corresponds to the first internal model.

Figure 10:
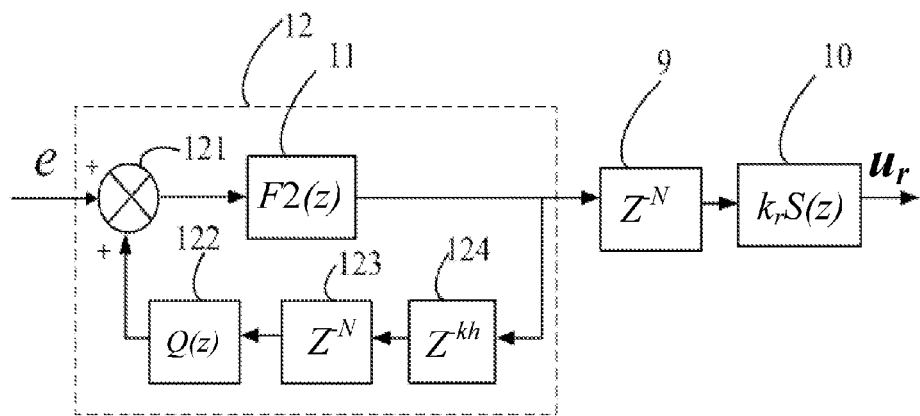
FIG. 10 is a schematic diagram showing the structure of a repetitive controller according to a sixth embodiment of the disclosure.

FIG. 10 shows the repetitive controller according to the sixth embodiment. As shown, the modules in FIG. 10 are the same with those in FIG. 7, respectively, except the locations of the particular frequency selection and passing module 11 and the different internal models. The particular frequency selection and passing module 11 is the frequency selection and phase shift module F2(z) provided on the forward path of the internal model section 12.

The internal model section 12 corresponds to the second internal model and includes an adder 121, an internal model delay module 124, an internal model periodic delay module 123 and an internal model filtering module 122. The first input terminal of the adder 121 is the input terminal of the internal model section 12. The internal model delay module 124, the internal model periodic delay module 123 and the internal model filtering module 122 are connected in series to form a feedback path. The output terminal of the feedback path is connected to the second input terminal of the adder 121, and the input terminal of the feedback path is connected to the output terminal of the adder 121. The feedback path and the forward path constitute a closed ring, to form the internal model section 12. The internal model filtering module 122 is denoted as Q(z) which may be a filter or may be a constant less than 1. The internal model periodic delay module 123 is denoted as $z^{-N}$. The internal model delay module 124 is denoted as $z^{-k_h}$. In this embodiment, the internal model delay module 124 is incorporated. In this way, the function of phase lagging of the internal model delay module 124 on the feedback path may counteract with the phase lead compensation of the frequency selection and phase shift module F2(z) on the forward path, to ensure that the phase shift at the second input terminal of the adder 121 is zero.

In the case that the frequency selection and phase shift module F2(z) is provided on the forward path of the internal model section 12, as an example, if the frequency selection and phase shift module F2(z) is a DCT filter, the transfer function of the repetitive controller is as follows:

$$\frac{2}{N}\sum_{i=0}^{N-1}\left\{\sum_{h\in N_h}\cos\left(\frac{2\pi}{N}hi+k_h\right)\right\}z^{-i}\times \qquad (6)$$

$$\frac{z^{-N}}{1-\frac{2}{N}\sum_{i=0}^{N-1}\left\{\sum_{h\in N_h}\cos\left(\frac{2\pi}{N}hi\right)\right\}z^{-i}\times Q(z)z^{-N}}\times k_r z^k S(z)$$

Figure 11:
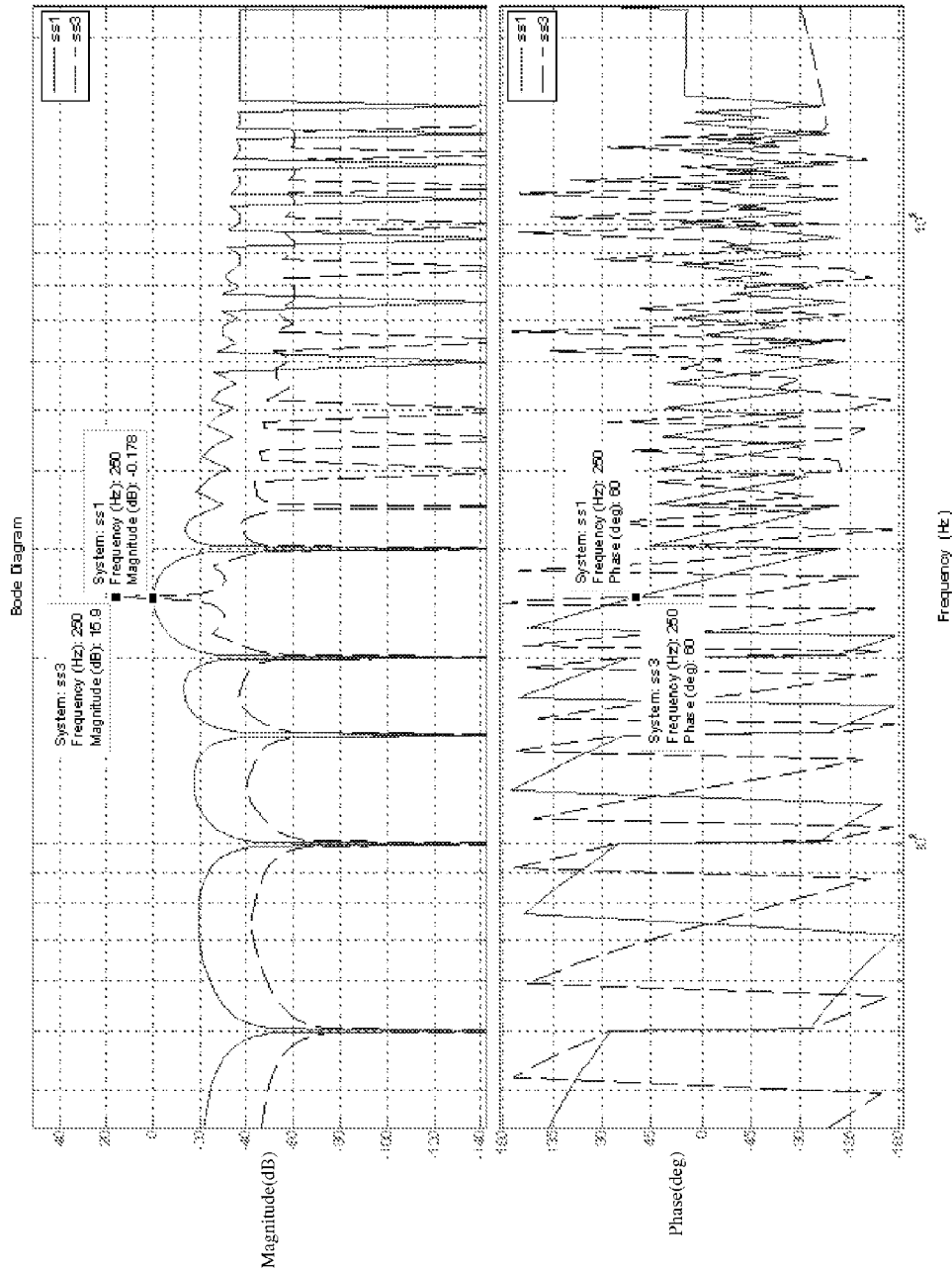
FIG. 11 is a schematic diagram illustrating an emulation result of the repetitive controller shown in FIG. 10.

As an emulation example of the repetitive controller shown in FIG. 10, it is supposed that the parameters are the same with those described above in the emulation example of the repetitive controller shown in FIG. 7 according to the fourth embodiment. FIG. 11 shows the amplitude-frequency characteristics and the phase-frequency characteristics of the emulated frequency selection module F1(z) and the repetitive controller. As shown in FIG. 11, the upper part diagram illustrates the amplitude-frequency characteristics, and the lower part diagram illustrates the phase-frequency characteristics; the solid line ss1 corresponds to the characteristics of the frequency selection and phase shift module F2(z) and the dot line ss3 corresponds to the characteristics of the repetitive controller. With respect to the solid line ss1, as shown in the amplitude-frequency characteristics, only the gain at the frequency of 250 Hz (i.e. the $5^{th}$ harmonic) is −0.178 dB, which is nearly 0 dB, while the gains at other frequencies are much lower than −3 dB, that is, it is attenuated or cut off for the other frequencies; and as shown in the phase-frequency characteristics, the phase at the frequency of 250 Hz is 60°. As can be seen, the frequency selection and phase shift module F2(z) may pass the $5^{th}$ harmonic with a phase shift of 60° and without attenuation, while it is attenuated or cut off for the signal at other frequencies. With respect to the dot line ss3, as shown in the amplitude-frequency characteristics, only the gain at the frequency of 250 Hz is 15.9 dB, while the gains at other frequencies are much lower than −3 dB; and as shown in the phase-frequency characteristics, the phase at the frequency of 250 Hz is 60°. As can be seen, the control of the repetitive controller on the $5^{th}$ harmonic is much higher than that on the signal at other frequencies. In addition, the repetitive controller may realize a phase lead compensation of 60° to the $5^{th}$ harmonic, while it does not perform such a control on the signal at other frequencies. Therefore, the repetitive controller can remove the harmonic at the particular frequency, i.e. the 5th harmonic.

The Seventh Embodiment

The seventh embodiment provides a control method of a repetitive controller according to any of the above embodiments. In the conventional control method of repetitive controller, the input quantity to be subjected to repetitive control is directly input into the internal model section for signal reproduction and is output; then the signal is delayed by the periodic delay module and then compensated to obtain an output quantity of the repetitive control. In the control method according to the seventh embodiment, the input quantity of the repetitive controller is subjected to a particular frequency filtering processing before being input the internal model section, or the forward path of the internal model section, or the periodic delay module, or the compensation module, or before being output from the compensation module. The particular frequency filtering processing may be realized by a frequency selection module or a frequency selection and phase shift module.

Figure 12:
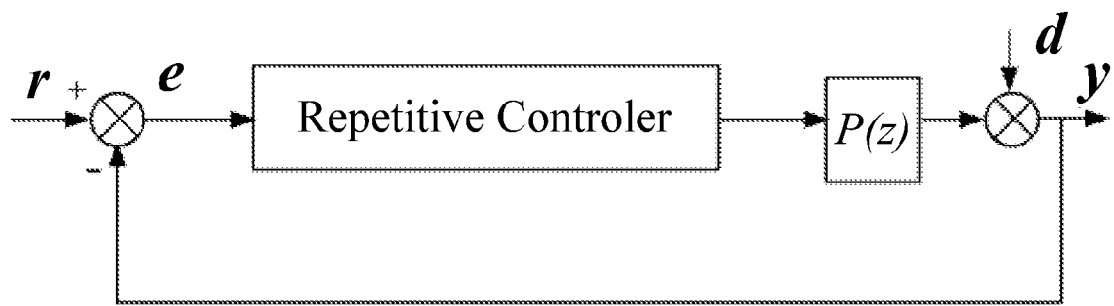
FIG. 12 is a schematic diagram showing the structure of a feedback control system according to a seventh embodiment of the disclosure.

According to another embodiment of the disclosure, there is provided a feedback control system. As shown in FIG. 12, the system may include a subtractor, a repetitive controller, a control object P(z) and an adder. The repetitive controller may be the repetitive controller according to any of the above described embodiments. A positive input terminal of the subtractor is configured to receive a given input quantity r and a negative input terminal of the subtractor is connected to an output terminal of the adder. An output terminal of the subtractor is connected to an input terminal of the repetitive controller. An output terminal of the repetitive controller is connected to the control object P(z). An output terminal of the control object P(z) is connected to a first input terminal of the adder. A second input terminal of the adder is connected to a system disturbance quantity d. The output terminal of the adder outputs an output quantity y, as a feedback quantity which is input into the negative input terminal of the subtractor. The feedback control system utilizes the repetitive controller according to any of the above described embodiments to perform repetitive control, that is, the error between the given quantity and the feedback quantity of the feedback control system is controlled by the repetitive controller before being output.

While some embodiments of the disclosure are described above for better understanding of the disclosure, the disclosure should not be regarded as being limited to these. As can be appreciated by those skilled in the art, modifications or alterations may be made without departing from the concept of the disclosure and such modifications or alterations fall within the protection scope of the disclosure so far as they have the same performance or purpose.

What is claimed is:

1. A repetitive controller, comprising an internal model section, a periodic delay module and a compensation module, an input quantity being input into the repetitive controller via an input terminal of the internal model section; the internal model section, the periodic delay module and the compensation module being connected in series; wherein the repetitive controller further comprises:
   a particular frequency selection and passing module configured to select and pass a signal at a particular frequency, and wherein the particular frequency selection and passing module is connected in series with the internal model section, the periodic delay module and the compensation module or configured on a forward path of the internal model section,
   wherein the compensation module comprises a repetitive control gain module and a compensation filtering module connected in series.

2. The repetitive controller of claim 1, wherein the particular frequency selection and passing module is further configured to perform a phase lead compensation to the signal at the particular frequency.

3. The repetitive controller of claim 1, wherein the compensation module further comprises a phase lead compensation module, and the repetitive control gain module, the phase lead compensation module and the compensation filtering module are connected in series.

4. The repetitive controller of claim 3, wherein the internal model section comprises an adder, an internal model periodic delay module and an internal model filtering module; a first input terminal of the adder is the input terminal of the internal model section; the internal model periodic delay module and the internal model filtering module are connected in series to form a feedback path, an output terminal of the feedback path is connected to a second input terminal of the adder, and an input terminal of the feedback path is connected to an output terminal of the adder.

5. The repetitive controller of claim 1, wherein the particular frequency selection and passing module is a frequency selection and phase shift module, and the frequency selection and phase shift module is connected in series with the internal model section, the periodic delay module and the compensation module; the internal model section comprises an adder, an internal model periodic delay module and an internal model filtering module; a first input terminal of the adder is the input terminal of the internal model section; the internal model periodic delay module and the internal model filtering module are connected in series to form a feedback path;

an output terminal of the feedback path is connected to a second input terminal of the adder, and an input terminal of the feedback path is connected to an output terminal of the adder.

6. The repetitive controller of claim 1, wherein the particular frequency selection and passing module, which is a frequency selection and phase shift module, is provided on a forward path of the internal model section, the internal model section comprises an adder, an internal model delay module, an internal model periodic delay module and an internal model filtering module; a first input terminal of the adder is the input terminal of the internal model section; the internal model delay module, the internal model periodic delay module and the internal model filtering module are connected in series to form a feedback path; an output terminal of the feedback path is connected to a second input terminal of the adder, and an input terminal of the feedback path is connected to an output terminal of the adder.

7. A control method of a repetitive controller comprising an internal model section, a periodic delay module, a compensation module and a particular frequency selection and passing module connected in series with the internal model section, the periodic delay module and the compensation module or configured on a forward path of the internal model section, an input quantity being input into the repetitive controller via an input terminal of the internal model section; the internal model section, the periodic delay module and the compensation module being connected in series; the method comprising:

performing, by the internal model section, signal reproduction on the input quantity to be repetitively controlled;
delaying, by the periodic delay module, the input quantity and outputting a periodically delayed quantity; and
compensating the periodically delayed quantity to obtain a repetitively controlled quantity,
wherein the input quantity is subjected to a filter processing at a particular frequency by the particular frequency selection and passing module before being input into the internal model section or a forward path of the internal model section or the periodic delay module or the compensation module or before being output from the compensation module,
wherein the compensation module comprises a repetitive control gain module and a compensation filtering module connected in series, or the compensation module comprises a repetitive control gain module, a phase lead compensation module and a compensation filtering module connected in series.

8. A feedback control system, comprising a subtractor, a repetitive controller, a control object and an adder, wherein a positive input terminal of the subtractor is configured to receive a given input quantity and a negative input terminal of the subtractor is connected to an output terminal of the adder; an output terminal of the subtractor is connected to an input terminal of the repetitive controller; an output terminal of the repetitive controller is connected to the control object; an output terminal of the control object is connected to a first input terminal of the adder and a second input terminal of the adder is connected to a system disturbance quantity; and wherein the repetitive controller comprises an internal model section, a periodic delay module and a compensation module, an input quantity is input into the repetitive controller via an input terminal of the internal model section; the internal model section; the periodic delay module and the compensation module are connected in series; and the repetitive controller further comprises a particular frequency selection and passing module configured to select and pass a signal at a particular frequency, and wherein the particular frequency selection and passing module is connected in series with the internal model section, the periodic delay module and the compensation module or configured on a forward path of the internal model section, wherein the compensation module comprises a repetitive control gain module and a compensation filtering module connected in series, or the compensation module comprises a repetitive control gain module, a phase lead compensation module and a compensation filtering module connected in series.

* * * * *

UNITED STATES PATENT AND TRADEMARK OFFICE
CERTIFICATE OF CORRECTION

PATENT NO. : 8,682,455 B2
APPLICATION NO. : 13/451121
DATED : March 25, 2014
INVENTOR(S) : Guoshun Yang et al.

It is certified that error appears in the above-identified patent and that said Letters Patent is hereby corrected as shown below:

In the Specification:

At column 1, line 44, delete "u," and insert --$u_r$--

At column 5, line 38 (Approx.), delete "i-n" and insert --i-0--

At column 7, line 6 (Approx.), delete "i-=0" and insert --i-0--

At column 8, line 22, after "81.", delete "¶"

At column 8, line 60, delete "11, 5, 71" and insert --{1, 5, 7}--

At column 11, line 9, delete "i-=0" and insert --i-0--

In the Claims:

At column 13, line 14, in Claim 5, after "path;" delete "¶"

Signed and Sealed this
Twenty-second Day of July, 2014

Michelle K. Lee
*Deputy Director of the United States Patent and Trademark Office*